United States Patent
Annavajjala (10) Patent No.: US 9,166,669 B1
(45) Date of Patent: Oct. 20, 2015

(54) SPARSE ORDERED ITERATIVE GROUP DECISION FEEDBACK INTERFERENCE CANCELLATION

(71) Applicant: Altiostar Networks, Inc., Tewksbury, MA (US)

(72) Inventor: Ramesh Annavajjala, Quincy, MA (US)

(73) Assignee: Altiostar Networks, Inc., Tewksbury, MA (US)

(*) Notice: Subject to any disclaimer, the term of this patent is extended or adjusted under 35 U.S.C. 154(b) by 0 days.

(21) Appl. No.: 14/248,927

(22) Filed: Apr. 9, 2014

(51) Int. Cl.
*H04B 1/00* (2006.01)
*H04B 7/08* (2006.01)
*H04B 7/06* (2006.01)
*H04L 25/03* (2006.01)
*H04L 1/04* (2006.01)

(52) U.S. Cl.
CPC .............. *H04B 7/0857* (2013.01); *H04B 7/066* (2013.01); *H04L 1/04* (2013.01); *H04L 25/03057* (2013.01)

(58) Field of Classification Search
CPC ....... H04L 25/0204; H04L 1/005; H04L 1/04; H04L 25/03; H04L 1/0048; H04L 2025/03414; H04L 25/03292; H04L 25/0328; H04L 25/0202; H04L 25/0206; H04B 1/7107; H04B 1/71075; H04B 1/71055; H04B 7/0413

USPC .............. 375/267, 148, 260, 347, 349, E1.02, 375/E1.024, E1.03; 455/63.1, 296, 303, 455/501, 11, 132, 114.2, 500

See application file for complete search history.

(56) References Cited

U.S. PATENT DOCUMENTS

| 7,701,917 B2* | 4/2010 | Mantravadi et al. .......... 370/343 |
| 2007/0030914 A1* | 2/2007 | Ding et al. .................... 375/260 |
| 2008/0292032 A1* | 11/2008 | Belogolovy et al. .......... 375/346 |
| 2013/0044797 A1 | 2/2013 | Nammi |
| 2013/0343446 A1* | 12/2013 | Eliaz et al. .................... 375/230 |

OTHER PUBLICATIONS

Ilic et al., Sparsity Enhanced Decision Feedback Equalization. Signal Processing, IEEE Transactions. Feb. 28, 2012;60(5):2422-32.

* cited by examiner

*Primary Examiner* — Rahel Guarino
(74) *Attorney, Agent, or Firm* — Mintz Levin Cohn Ferris Glovsky and Popeo, P.C.

(57) ABSTRACT

Data can be received characterizing a first signal received on a plurality of antennas and comprising multiple transmission signals transmitted simultaneously on at least a same resource element in an orthogonal frequency-division multiple access (OFDM) communications system. A final estimate of the multiple transmission signals can be determined from at least the received data by iteratively estimating multiple transmission signals from the first signal and feeding back selected estimated multiple transmission signals, which satisfy a criterion, to cancel components of the first signal. Data characterizing the estimated multiple transmission signals can be provided. Related apparatus, systems, techniques, and articles are also described.

24 Claims, 7 Drawing Sheets

SPARSE ORDERED ITERATIVE GROUP DECISION FEEDBACK INTERFERENCE CANCELLATION

TECHNICAL FIELD

The subject matter described herein relates to signal detection over wireless channels, including cancellation of interference originated from multiple simultaneous transmissions in a cellular wireless system.

BACKGROUND

Wireless systems such as the ones based on the IEEE 802.11 standard for indoor local area communication, and the Third Generation Partnership Project (3GPP) based Long Term Evolution (LTE) for terrestrial cellular communication use multiple antennas for transmission and reception, both at an access point (e.g., base-station) and a user terminal (e.g., user equipment (UE)). Multiple-input and multiple-output (MIMO) technology with multiple antennas at a transmitter and a receiver allows for transmitting more than one data stream on the same set of resources (e.g., physical time and frequency resources), thereby significantly increasing data rates over the wireless links with limited transmission bandwidth. Additionally, MIMO systems lead to antenna diversity, which includes wireless diversity schemes that uses multiple antennas to improve the quality and reliability of a wireless link by providing a receiver several observations of the same signal with different channel and interference environment. In other words, if one antenna is experiencing a deep fade, it is likely that another has a sufficient signal. The use of multiple receiver antennas leads to improved receiver diversity, thereby enhancing the received signal quality and reducing the packet error rate. With multiple transmitter antennas, the transmitted signals can be directed to the intended receiver, via transmitter beam-forming techniques, to improve coverage, extend range, and minimize interference caused to unintended receivers.

For UE with a single transmitting antenna, multiple antennas at the base-station (e.g., a single-input and multiple-output (SIMO) configuration) can be used to provide interference rejection capability. An example of spatial-division multiple access (SDMA) includes more than one UE transmits simultaneously to a base-station, and a base-station with multiple receiver antennas, which can jointly decode signals transmitted by the multiple UEs. This simultaneous transmission and joint detection technique can also be referred to as multi-user (MU) MIMO. In MU MIMO, each UE can have more than one transmitter antenna, and more than one transmission stream.

SUMMARY

In an aspect, data can be received characterizing a first signal received on a plurality of antennas and comprising multiple transmission signals transmitted simultaneously on at least a same resource element in an orthogonal frequency-division multiple access (OFDM) communications system. A final estimate of the multiple transmission signals can be determined from at least the received data by iteratively estimating multiple transmission signals from the first signal and feeding back selected estimated multiple transmission signals, which satisfy a criterion, to cancel components of the first signal. Data characterizing the estimated multiple transmission signals can be provided.

One or more of the following features can be included. For example, the final estimate of the multiple transmission signals can include the estimated multiple transmission signals that are selected during each iteration. The selected estimated multiple transmission signals can be selected based on having low error. A predetermined number of estimated multiple transmission signals can be selected during an iteration. The iterative estimation can be performed until a stopping condition is reached. The stopping condition can be selected from a group consisting of: all symbols of the multiple transmission signals have been selected, a predetermined number of multiple transmission signals have been selected, and a level of error in a most recently estimated symbol exceeds a threshold. Estimating multiple transmission signals from the first signal is performed according to:

$$\hat{X} = \text{slicer}((G^{Herm}G + \hat{\sigma}_v^2 I_K)^{-1} G^{Herm} y).$$

Canceling components of the first signal can be according to: $y=y-G\hat{X}(i_{selected})$ where y is the first signal, G is an estimate of channel characteristics $\hat{X}$, is estimated multiple transmission signals, and $i_{selected}$ can be the indices of symbols that have been selected.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein. Additionally, computer systems may include additional specialized processing units that are able to apply a single instruction to multiple data points in parallel. Such units include but are not limited to so-called "Graphics Processing Units (GPU)."

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Like reference symbols in the various drawings indicate like elements.

DETAILED DESCRIPTION

A sparse ordered iterative group decision feedback interference cancellation (SOI-GDFIC) scheme is described, which can be used to estimate simultaneous multiple signal transmissions received at a receiver (including a transceiver) equipped with multiple receiver antennas. SOI-GDFIC can iteratively estimate signal transmissions by, for example, creating estimates of signal transmissions from a received signal and feeding back some of the estimates, which have a sufficiently low error (or satisfy another criterion), to modify the received signal by canceling components of the received signal, and using the modified received signal to re-estimate the signal transmissions. The SOI-GDFIC scheme can continue to process the received signal until an estimate of some or all transmitted signals are obtained.

Figure 1:
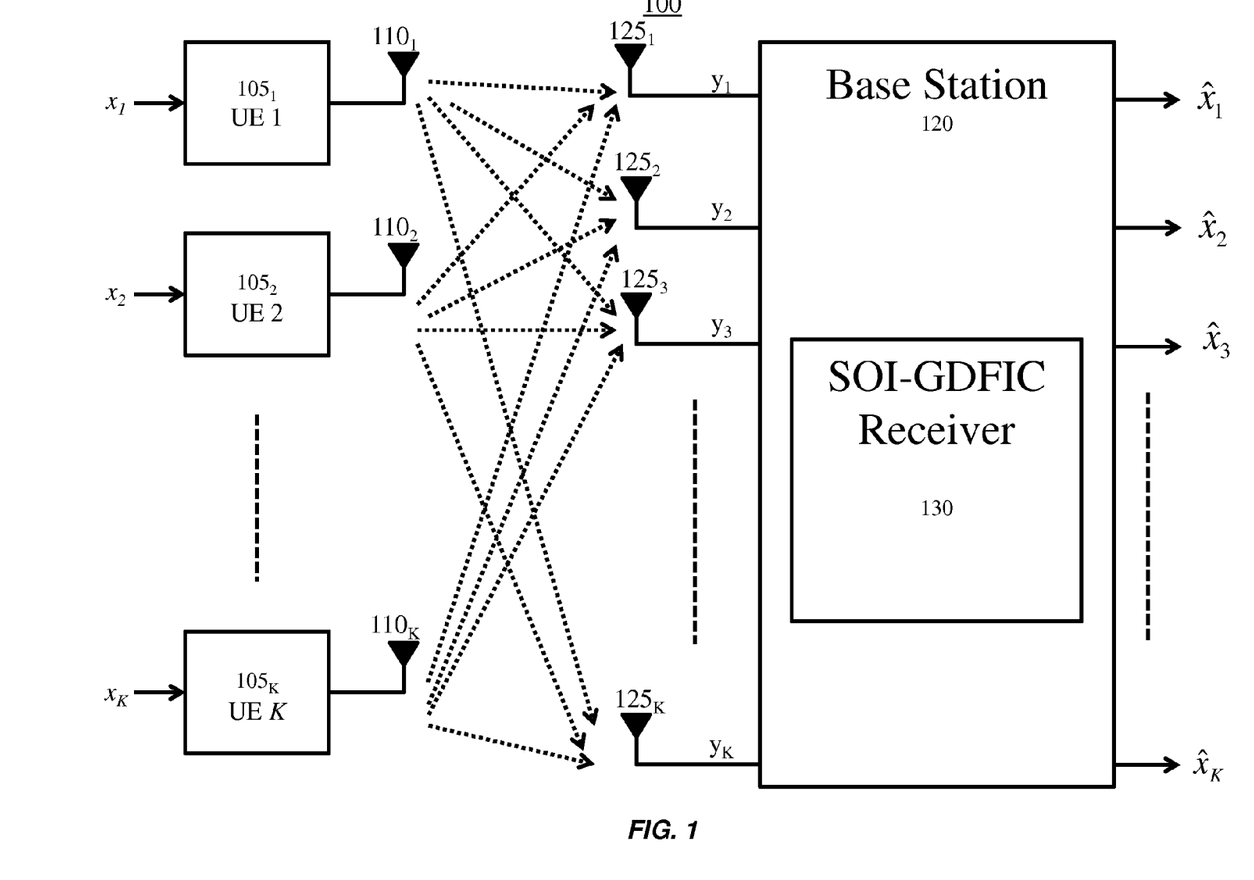
FIG. 1 is a system diagram illustrating a Multi-UE SDMA system with a sparse ordered iterative group decision feedback interference cancellation receiver located at a base station.

SOI-GDFIC can be implemented in a number of systems including at a base station or at a UE. For example, FIG. 1 is a system diagram illustrating a Multi-UE SDMA (or MU-SIMO) system 100 with a SOI-GDFIC receiver 130 located at a base station 120. The system 100 includes multiple UEs ($105_1$, $105_2$, ..., $105_k$), each having a single transmit antenna ($110_1$, $110_2$, ..., $100_k$), which communicate with the base station 120 having multiple receive antennas ($125_1$, $125_2$, ..., $125_k$). Transmission signals (X(n)=[$x_1$(n), $x_2$(n), ..., $x_K$(n)]) are transmitted from the UEs 105 to base station 120, where the received signal (Y(n)=[$y_1$(n), $y_2$(n), ..., $y_K$(n)]) is used to create an estimation of the transmitted signals (the estimation of X(n) denoted by $\hat{X}_{final}$(n)=[$\hat{x}_1$(n), $\hat{x}_2$(n), ..., $\hat{x}_K$(n)]).

Figure 2:
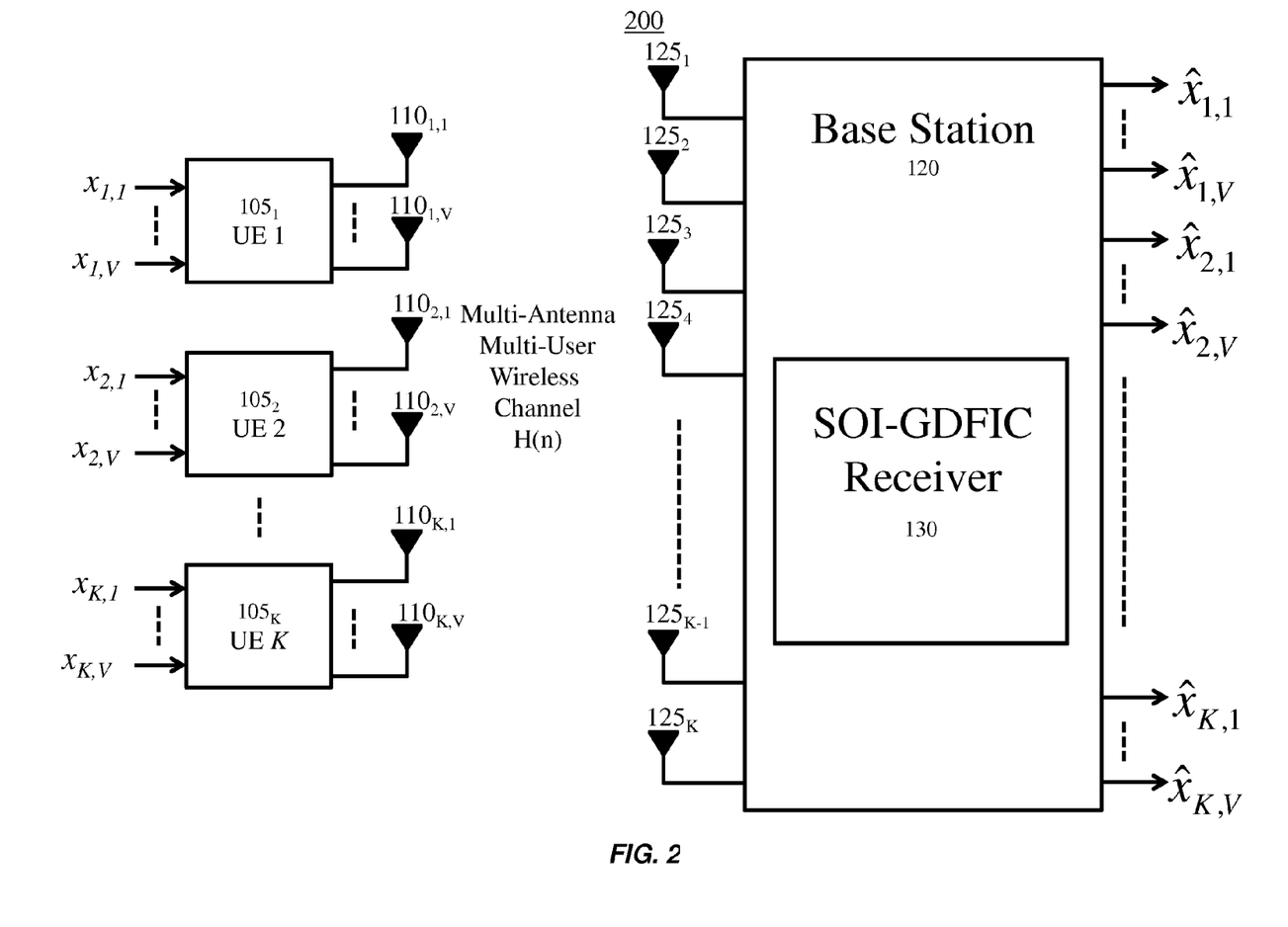
FIG. 2 is a system diagram illustrating a Multi-UE Multi-stream SDMA system with a sparse ordered iterative group decision feedback interference cancellation receiver located at a base station.

As a second example, FIG. 2 is a system diagram illustrating a Multi-UE Multi-stream SDMA (or MU-MIMO) system 200 with a SOI-GDFIC receiver 130 located at the base station 120. Each UE 105 can transmit multiple streams to the base station 120. While FIG. 2 illustrates that the number of antennas on each UE 105 and the number of the antennas on the base station 120 are equal, the number of antennas on either the UE 105 and/or base station 120 can vary. In some example implementations, the number of streams per UE 105 does not exceed the number of transmit antennas at that UE 105, and the total number of streams (summed across all the UEs 105) does not exceed the number of receive antennas at the base station 120.

Figure 3:
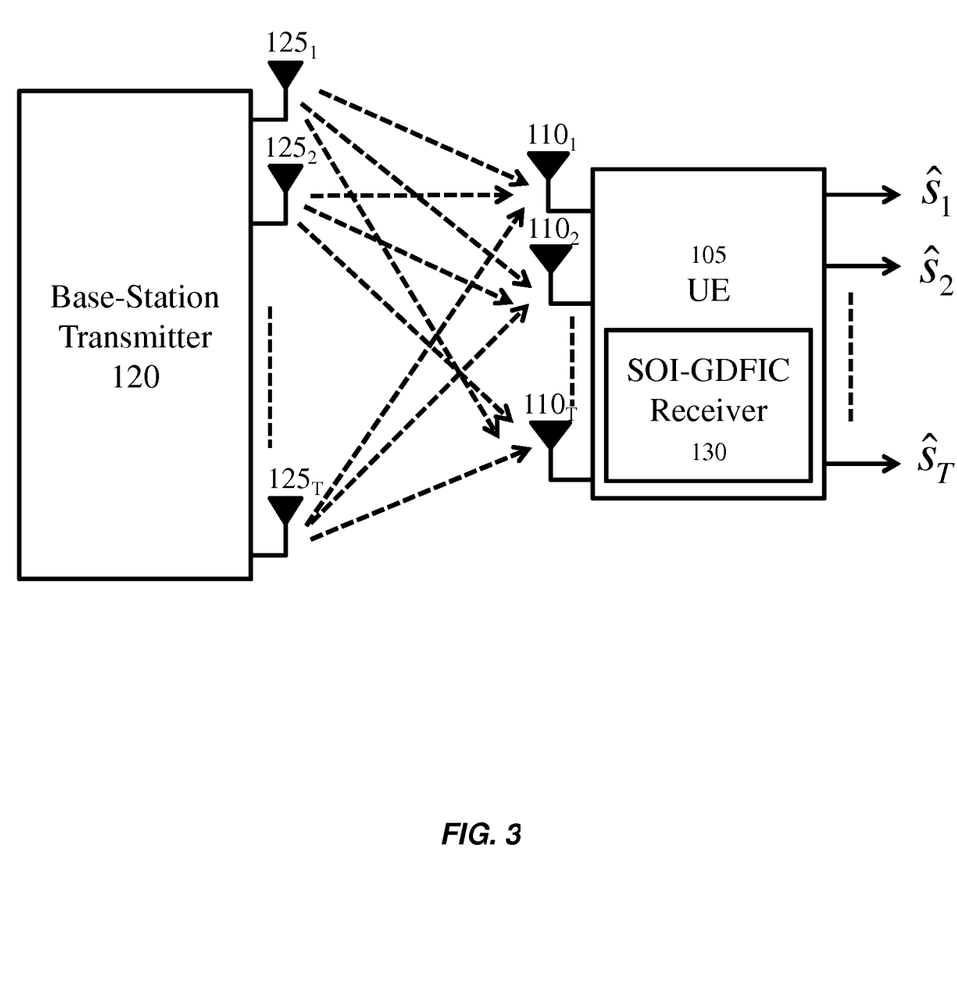
FIG. 3 is a system diagram illustrating a base station transmitter and a UE with a sparse ordered iterative group decision feedback interference cancellation receiver.

As yet another example, FIG. 3 is a system diagram illustrating a base station 120 transmitter and a UE 105 with a SOI-GDFIC receiver 130. As described herein, the SOI-GDFIC receiver 130 can operate either in the uplink or downlink.

As illustrated in FIGS. 1-2, SOI-GDFIC can apply to a wireless system in which multiple users transmit information simultaneously to a single base-station on identical time and frequency resources. This access mechanism can be referred to as SDMA. For wireless systems with orthogonal frequency-division multiple access (OFDM, a variant of a more general multi-carrier modulation technique, which is the access technology used in 3GPP LTE (downlink) and IEEE 802.16e standards (downlink as well as uplink)), time resources correspond to OFDM symbols and frequency resources correspond to subcarriers. For LTE uplink, modulation symbols are Discrete Fourier Transform (DFT) pre-coded at the transmitter prior to OFDM modulation. In some example implementations, MIMO-specific precoding can be applied in uplink as well as downlink LTE. A certain subcarrier on a certain OFDM symbol for these systems can also be referred to as a resource element (RE).

Figure 4:
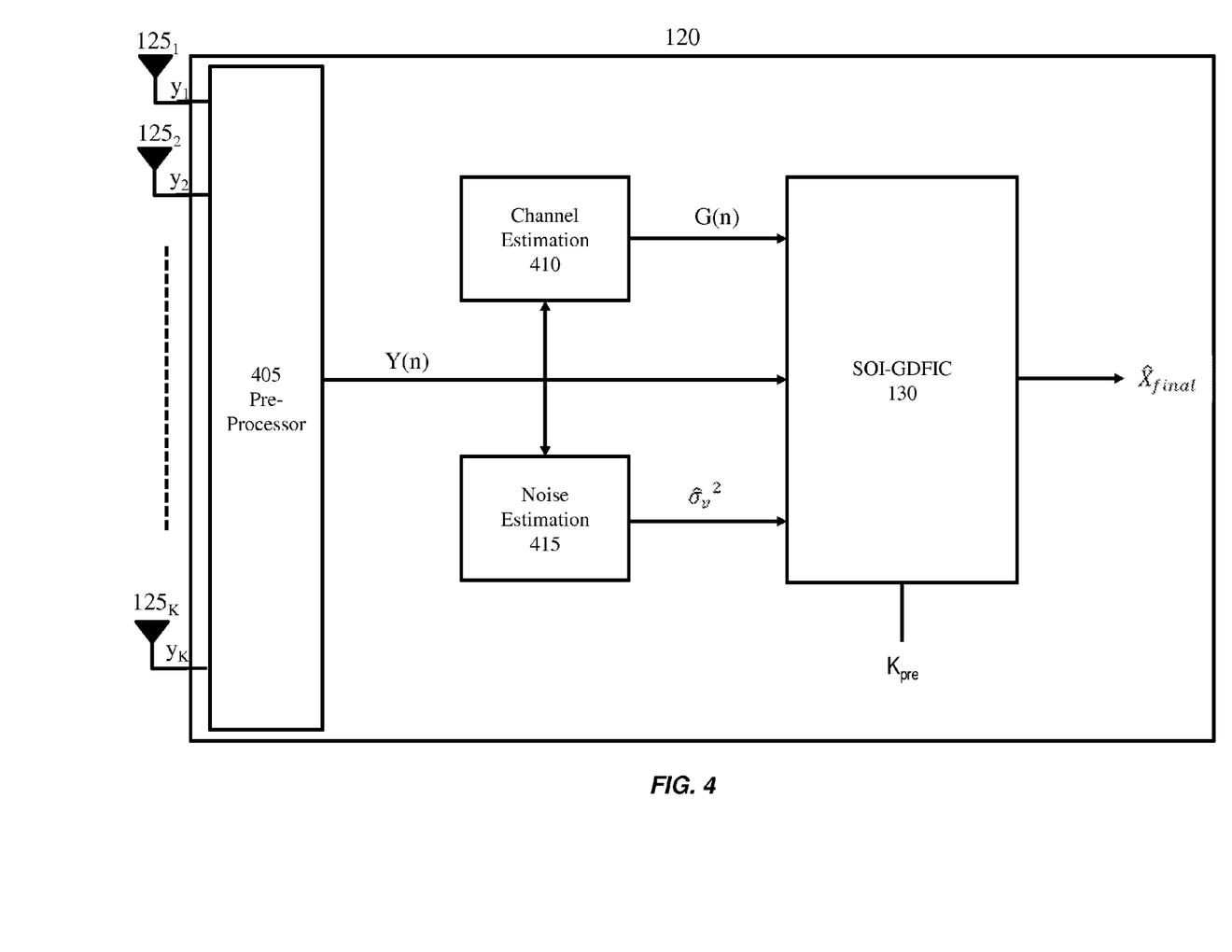
FIG. 4 is a system diagram of a base station and an example implementation of a sparse ordered iterative group decision feedback interference cancellation receiver.

FIG. 4 is a system diagram of a base station 120 with an example implementation of a SOI-GDFIC receiver 130. Initially, the following assumes that each UE 105 has single antenna 110 for transmission (e.g., in the configuration shown in FIG. 1), although the SOI-GDFIC can work with UEs 105 having multiple antennas 110 (e.g., the configuration shown in FIG. 2), in downlink (e.g., configuration shown in FIG. 3), and in other configurations. With K denoting the number of simultaneously transmitting users, and the modulation symbol vector of user k, $$x_k = [x_k(1), x_k(2), \ldots, x_k(N)]^T,$$

where T is the transpose operator and N the number of modulation symbols, the received signal at the base-station 120 with M receiver antennas is described as $$y(n) = h_1(n)x_1(n) + h_2(n)x_2(n) + \ldots + h_K(n)x_K(n) + v(n) \quad n = 1, 2, \ldots,$$

$$N = [h_1(n), h_2(n), \ldots, h_K(n)] \begin{bmatrix} x_1(n) \\ x_2(n) \\ \ldots \\ x_K(n) \end{bmatrix} + v(n) = H(n)X(n) + v(n)$$

where, for symbol index (or RE index) n, H(n)=[$h_1$(n), $h_2$(n), ..., $h_K$(n)] is the matrix-valued composite channel gain from all the UEs 105 to the base-station 120 (e.g., the channel characteristics), v(n) is the additive noise as seen at the base-station 120, and X(n)=[$x_1$(n), $x_2$(n), ..., $x_K$(n)]$^T$ is the composite modulation vector from all the UEs 105. The example SOI-GDFIC receiver 130 attempts to recover the joint modulation symbol vector of all the users, X(n), for n=1, 2, ..., N.

In the example implementation of FIG. 4, the received signal y(n) can undergo preprocessing at pre-processor 405. Preprocessing can include, for example, low noise amplification (LNA), down-conversion, receiver filtering, in-phase and quadrature (I&Q) demodulation, cyclic prefix (CP) removal, Fast Fourier Transform (FFT), antenna de-mapping, resource de-mapping, and the like. Other preprocessing is possible.

In the example implementation of FIG. 4, an estimate of the channel matrix H(n) can be obtained using channel estimator block 410. Channel estimation can be obtained by having each UE 105 transmit known (also referred to as pilot) symbols to the base-station 120 to facilitate the base-station 120 obtaining an estimate of H(n). For an LTE uplink, demodulation reference symbols (DMRS) can be used to estimate the unknown wireless channel gain for uplink data and control channels. In time-domain duplexing systems that exploit uplink-downlink symmetry (that is, the channel gain from the UE 105 to base-station 120 in the uplink direction is the same as the channel gain from the base-station 120 to the UE in the downlink direction), the UE 105 can estimate the channel during the downlink transmission, and feed this estimate back to the base-station 120 to be used later for the uplink reception. Channel estimation can be obtained through other methods. An estimate of H(n) is denoted as G(n).

In the example implementation of FIG. 4, an estimate of the noise variance per complex dimension $\hat{\sigma}_v^2$ can be estimated by noise estimator 415. In the absence of any knowledge of $\hat{\sigma}_v^2$, a suitable positive number λ can be employed. The value of λ can be derived, for example, from either link- or system-level simulations.

The SOI-GDFIC receiver 130 can be supplied with the received signal vector y(n), the channel estimate G(n), the estimate of the noise variance per complex dimension $\hat{\sigma}_v^2$, and a number of symbols to be jointly detected per iteration, $K_{pre}$, which is between 1 and K (i.e., $1 \leq K_{pre} \leq K$). Using the received signal vector y(n), the channel estimate G(n), and the estimate of the noise variance $\hat{\sigma}_v^2$, the SOI-GDFIC receiver 130 can iteratively recover entries of estimates of X(n), denoted by $\hat{X}_{final}(n)$. For simplicity, the symbol (or RE) index n is dropped in the following.

Figure 5:
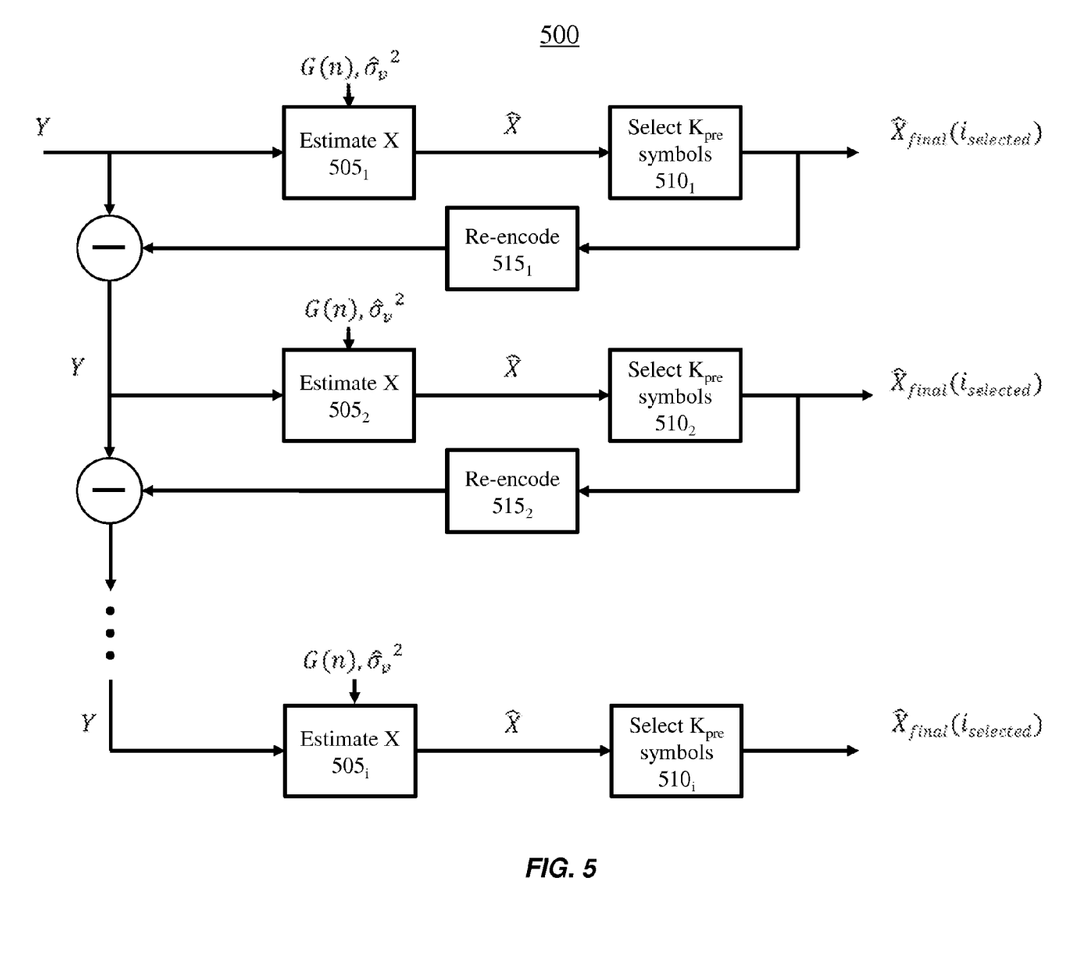
FIG. 5 is a functional block diagram illustrating an iterative process to estimate transmitted signals.

FIG. 5 is a functional block diagram 500 illustrating an iterative SOI-GDFIC process to estimate $\hat{X}_{final}$. The SOI-GDFIC receiver 130 can obtain, at 505$_1$, an initial estimate of the modulation vector X as $$\hat{X} = \text{slicer}\left((G^{Herm}G + \hat{\sigma}_v^2 I_K)^{-1} G^{Herm} y\right)$$

where slicer is the de-mapper function that operates independently on each entry of the complex-valued vector supplied to it, and $I_K$ is a K-by-K identity matrix.

The estimates $\hat{X}$ can be evaluated and $K_{pre}$ symbols (e.g., entries) of $\hat{X}$ can be selected at 510$_1$. The selection can be based on a criterion such as symbols that result in the lowest errors. For example, a residual signal vector can be formed as $R = y - G\hat{X}$ and the error signal vector can be formed as $E = G^{Herm}R$. Using the error signal vector E, the $K_{pre}$ lowest error symbols in $\hat{X}$ can be selected. The indices of the selected symbols can be denoted by $i_{selected}$. The selected symbols can be saved or stored as corresponding entries in $\hat{X}_{final}$ (e.g., $\hat{X}_{final}(i_{selected}) = \hat{X}(i_{selected})$).

The selected symbols can, at 515$_1$, be re-encoded and subtracted or canceled from the received signal y. The selected symbols can be re-encoded by computing $$y = y - G\hat{X}(i_{selected})$$

The transformed received signal y can then be used at 505$_2$ to estimate X in the absence of interference from the selected symbols. The process can iterate (e.g., through 505$_i$, 510$_i$, and 515$_i$) until all symbols are selected, or until another stopping criterion is reached. Other stopping criterion can include, for example, a number of iterations, a level of error in the estimated symbols exceeds a threshold, and the like.

The following is an algorithm for an example implementation of a SOI-SDOIC receiver 130.
1. Initialization Phase
   a) obtain an initial estimate of the modulation vector X as $$\hat{X} = \text{slicer}\left((G^{Herm}G + \hat{\sigma}_v^2 I_K)^{-1} G^{Herm} y\right)$$

b) Form the residual signal vector: $R = y - G\hat{X}$
   c) Form the error signal vector: $E = G^{Herm}R$
   d) Obtain the following set of indices Indices=1:K IndicesToCancel=argsort(|E(n)|,'ascent')

IndicesToCancel=IndicesToCancel(1:$K_{pre}$)

IndicesRemain=setdiff(0)

where argsort function produces the indices of the sorted element, E(n) is the n-th element of the vector E, and setdiff(A,B) is the set difference between sets A and B.
   e) Store the correct symbols onto the final solution space $X_{final}$(IndicesToCancel)=$\hat{X}$(IndicesToCancel)

OverallIndicesToCancel=IndicesToCancel

Idx=IndicesToCancel

2. Execute the following sequence of steps while length (OverallIndicesToCancel)<K:
   a) Feedback the correct symbols:

$y = y - G(:,\text{IndicesToCancel})\hat{X}(\text{IndicesToCancel})$ b) Obtain the symbol estimates of the remaining indices $$\hat{X} = \text{slicer}\left(((G^{Herm}(:,\text{IndicesRemain})G(:,\text{IndicesRemain}) + \hat{\sigma}_v^2 I_{length(IndicesRemain)})^{-1}\right.$$
$$\left. G^{Herm}(:,\text{IndicesRemain})y\right)$$

In the above, A(:,Idx) denotes choosing all the rows of A, but only the columns of A indexed by Idx.
   c) Calculate the residual signal vector, error signal vector, and the indices to cancel in the next iteration
   Residual Signal Vector: $R = y - G\hat{X}$
   Error Signal Vector: $E = G^{Herm}R$
   Indices to cancel for the next iteration: Indices=argsort (|E|, 'ascend')
   If $K_{pre}$ is less than or equal to the length(abs(|E|)), then set
   Indices=Indices(1:$K_{pre}$)
   IndicesToCancel=IndicesReamin(Indices)
   If IndicesToCancel is empty, then break. Otherwise, do $X_{final}$(IndicesToCancel)=(Indices)

IndicesRemain=setdiff(IndicesRemain,IndicesToCancel)

OverallIndicesToCancel=setunion(OverallIndicesToCancel,IndicesToCancel)

In the above, setunion(A,B) is the union of the sets A and B.
3. The estimated symbol sequence is $X_{final} = [X_{final}(1), X_{final}(2), \ldots, X_{final}(K)]$ An SOI-GDFIC receiver can operate as a substitute for other receivers such as MMSE, Zero-forcing, DFE, and joint maximum likelihood (JML) receivers. For example, for a JML receiver, under uncorrelated Gaussian noise assumption for v(n), the optimal detector is a nonlinear receiver that searches for a sequence $U = [u_1, u_2, \ldots, u_K]$ from all possible sequences that minimize the squared Euclidean distance $\|y(n) - G(n)U\|^2$. The total number of sequences to search through is the product $$\prod_{k=1}^{K} M_k,$$

where $M_k$ is the constellation size for user k. This search space quickly goes unbounded exponentially with increasing number of users, and with larger constellation sizes.

A linear minimum-mean-square error (LMMSE) receiver recovers X(n) by pre-multiplying y(n) with $(G^{Herm}(n)G(n)+$ $R_v(n))^{-1} G^{Herm}(n)$, where $R_v(n)$ is the covariance matrix of the noise $v(n)$ that must be known to the receiver. Even when $G(n)=H(n)$ (i.e., with perfect channel estimation), and in the absence of noise, $X(n)$ can only be recovered with some bias, and there is a tradeoff between signal bias and reconstruction error variance. The LMMSE receiver requires knowledge of second order statistics of noise and interference and maximum diversity order achievable per decoded transmission is one (i.e., the average error rate decays inverse linearly with the average received SNR).

Another alternative is a linear zero-forcing (ZF) receiver, which recovers $X(n)$ by pre-multiplying $y(n)$ with $(G^{Herm}(n) G(n))^{-1} G^{Herm}(n)$, where Herm is the Hermitian operator (or conjugate-and-transpose operator) applied to a complex-valued matrix. When $G(n)=H(n)$ (i.e., with perfect channel estimation), and in the absence of noise, $X(n)$ will be recovered perfectly. In the presence of noise, however, ZF receiver amplifies the noise, thereby reducing the output SINR (signal-to-interference-plus-noise ratio). Imperfect channel estimation in the presence of noise leads to inter-user interference in addition to degradation in output SINR. Further, in a ZF receiver, maximum diversity order achievable per decoded transmission is one (i.e., the average error rate decays inverse linearly with the average received SNR). Additionally, performance of linear receivers can be impacted by spatial correlation.

As an alternative to linear detection methods, a base station can perform nonlinear detection, such as decision feedback equalization (DFE, also referred to as successive interference cancelation (SIC)) or JML. A DFE performs, in an iterative fashion, decision on a given user and cancels regenerated signal contribution of this given user from the received signal before proceeding onto the detection of other users. With K users, the number of iterations a DFE requires to produce symbol estimates for all the users is at least K. A DFE further requires accurate detection of signals in the first stages to avoid error propagation in the detection at later stages. Otherwise, error propagation affects the performance of a DFE receiver. The JML detector with equally likely transmission probabilities minimizes the probability of error. The JML detector retains the full diversity offered by the wireless channel. With K simultaneous transmissions, and K antennas at the base-station, the diversity order of the JML is K (i.e., the average error rate decays as inverse $K^{th}$ power of the average received SNR). However, JML receiver complexity is high. For example, if each user's constellation size is M, then the complexity of a JML receiver is $M^K$, which grows exponentially with the number of simultaneous transmissions.

Figure 6:
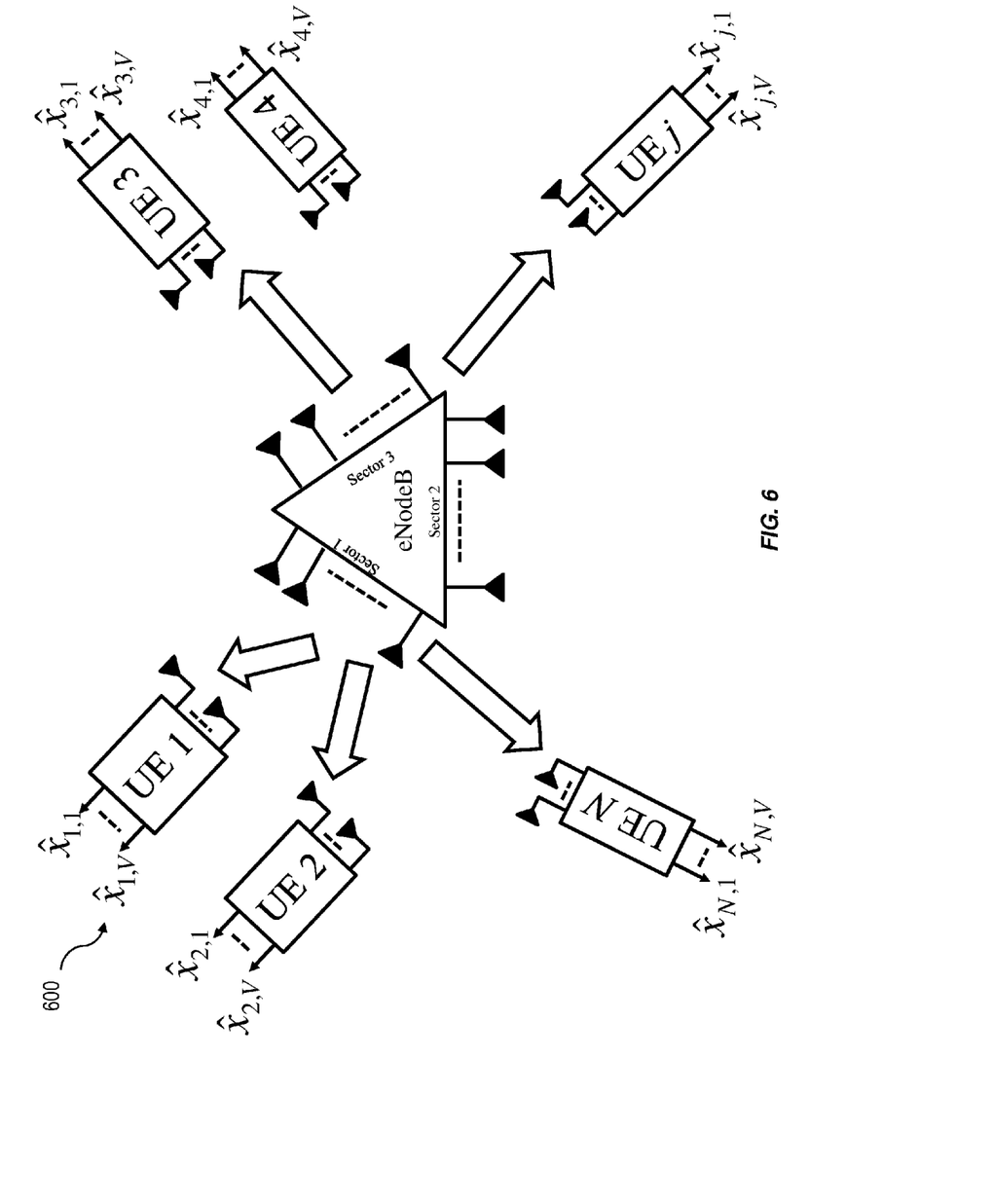
FIG. 6 is a diagram illustrating a communications system with a coordinated inter-sector downlink transmission.

A SOI-GDFIC scheme can be implemented in a number of configurations. For example, in the uplink or the downlink, in a base station and/or UE, in single or multiple input systems. As another example, FIG. 6 is a diagram illustrating a communications system with a coordinated inter-sector downlink transmission. In the context of downlink signal transmission by cooperating base-stations, certain number of cell-sectors can pool together their transmitting antennas to send multiple downlink streams. As illustrated in FIG. 6, a given base station or evolved node B (eNodeB) in LTE can have 3 cell-sectors. Each cell-sector can have up to 8 transmitter antennas to serve users in its coverage area. By pooling the transmitter antennas across these three cell-sectors, the eNodeB can effectively form 24 downlink distributed (or virtual) transmitter antennas, and can transmit potentially as many as 24 downlink streams. Instead of 3 cell-sectors, if the eNodeB has 6 cell-sectors, then it can transmit up to 48 downlink streams with these 48 virtual transmitting antennas to improve the downlink cell throughput.

The subject matter described herein provides many advantages. For example, a SOI-GDFIC receiver can require an initial matrix inversion of complexity $K^3$, and matrix inversions in later stages can have complexity monotonically decreasing with K, which can be in contrast to high complexity receivers such as ZF, MMSE, and JML receivers. And a per symbol detection complexity can be of the order of $K^2$. Because the symbol estimates used for interference cancelation can be obtained by exploiting the sparse nature of the decision feedback error vector, SOI-GDFIC receiver performance can approach the performance of JML, while needing less computational resources.

In addition, a SOI-GDFIC receiver does not require statistics of interference and noise, which is in contrast to a linear MMSE receiver that requires knowledge of the second order statistics of the noise and interference.

Further, a SOI-GDFIC receiver algorithm is applicable to more than an uplink or downlink of a point-to-point cellular system with multiple transmitter and receiver antennas. For example, the SOI-GDFIC algorithm can be applicable to a variety of scenarios such as a SDMA system with multiple users transmitting simultaneously using multiple streams with multiple transmitter-antennas, and co-ordinate multi-point transmission with transmitter antennas shared across the cell-sectors. These cell-sectors need not be co-located, and can be distributed in the cellular network.

Figure 7:
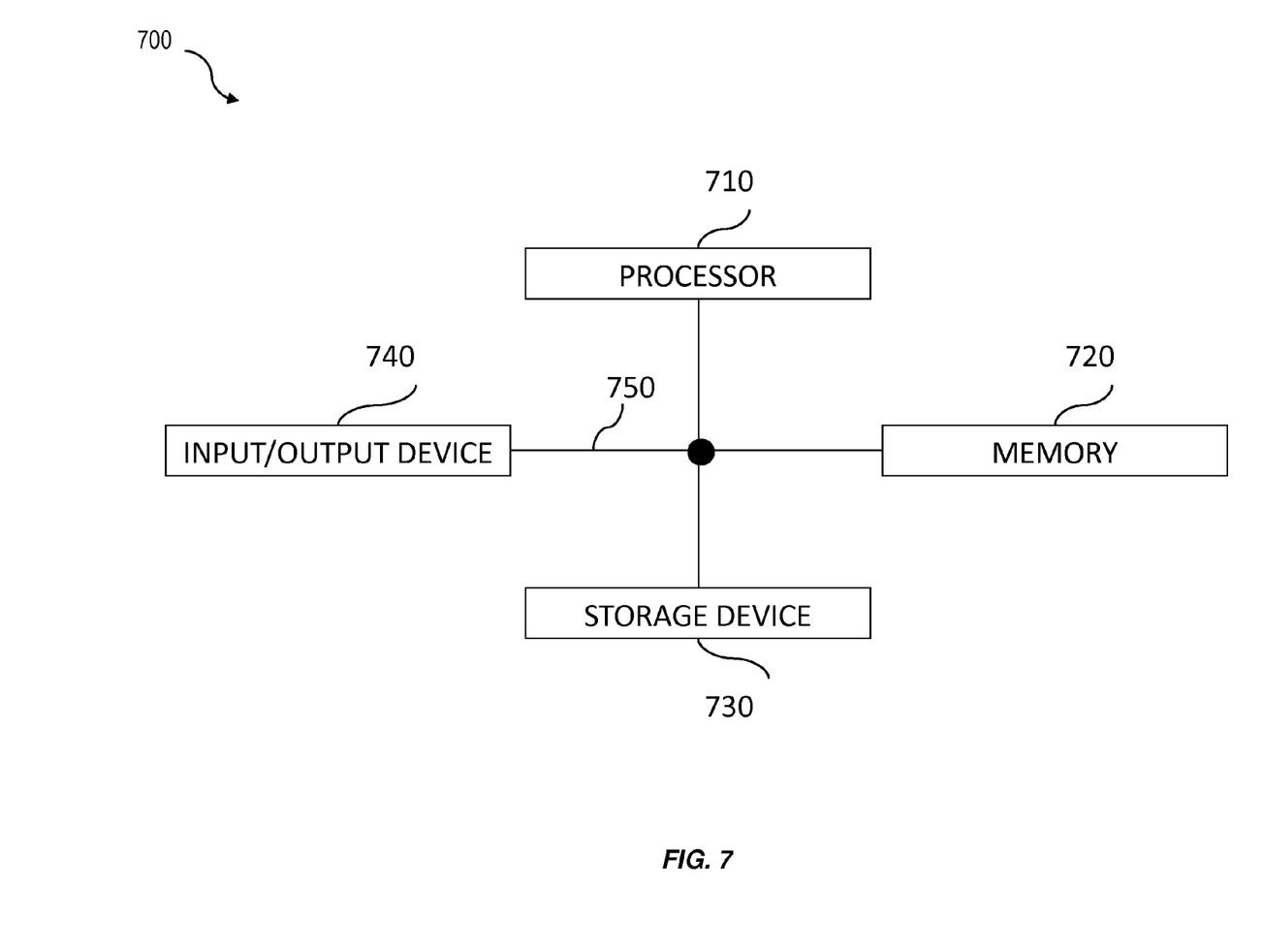
FIG. 7 is a system diagram illustrating an example implementation of a computing system.

In some implementations, the current subject matter can be configured to be implemented in a system 700, as shown in FIG. 7. The system 700 can include one or more of a processor 710, a memory 720, a storage device 730, and an input/output device 740. Each of the components 710, 720, 730 and 740 can be interconnected using a system bus 750. The processor 710 can be configured to process instructions for execution within the system 700. In some implementations, the processor 710 can be a single-threaded processor. In alternate implementations, the processor 710 can be a multi-threaded processor. The processor 710 can be further configured to process instructions stored in the memory 720 or on the storage device 730, including receiving or sending information through the input/output device 740. The memory 720 can store information within the system 700. In some implementations, the memory 720 can be a computer-readable medium. In alternate implementations, the memory 720 can be a volatile memory unit. In yet some implementations, the memory 720 can be a non-volatile memory unit. The storage device 730 can be capable of providing mass storage for the system 700. In some implementations, the storage device 730 can be a computer-readable medium. In alternate implementations, the storage device 730 can be a floppy disk device, a hard disk device, an optical disk device, a tape device, non-volatile solid state memory, or any other type of storage device. The input/output device 740 can be configured to provide input/output operations for the system 700. In some implementations, the input/output device 740 can include a keyboard and/or pointing device. In alternate implementations, the input/output device 740 can include a display unit for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A method for implementation by one or more data processors forming part of at least one computing system comprising:

receiving, by at least one data processor, data characterizing a first signal received on a plurality of antennas and comprising multiple transmission signals transmitted simultaneously on at least a same resource element in an orthogonal frequency-division multiple access (OFDM) communications system;

determining, using at least one data processor, a final estimate of the multiple transmission signals from at least the received data by iteratively estimating multiple transmission signals from the first signal and feeding back selected estimated multiple transmission signals, which satisfy a criterion, to cancel symbols of the first signal corresponding to the selected estimated multiple transmission signals; and providing, using at least one data processor, data characterizing the final estimate of the multiple transmission signals, the final estimate comprising the selected estimated multiple transmission signals that are selected at a plurality of iterations.

2. The method of claim 1, wherein the final estimate of the multiple transmission signals comprises the estimated multiple transmission signals that are selected during each iteration.

3. The method of claim 1, wherein the selected estimated multiple transmission signals are selected based on having low error that is determined using the received first signal and a channel estimate.

4. The method of claim 1, wherein a predetermined number of estimated multiple transmission signals are selected during an iteration.

5. The method of claim 1, wherein the iterative estimation is performed until a stopping condition is reached, the stopping condition selected from a group consisting of: all symbols of the multiple transmission signals have been selected, a predetermined number of multiple transmission signals have been selected, and a level of instantaneous error in a most recently estimated symbol from the first signal exceeds a threshold.

6. The method of claim 1, wherein estimating multiple transmission signals from the first signal is performed according to:

$$\hat{X} = \text{slicer}\left((G^{Herm}G + \hat{\sigma}_v^2 I_K)^{-1} G^{Herm} y\right).$$

7. The method of claim 1, wherein canceling components of the first signal is according to:

$$y = y - G\hat{X}(i_{selected})$$

where y is the first signal, G is an estimate of channel characteristics, $\hat{X}$ is estimated multiple transmission signals, and $i_{selected}$ is the indices of symbols that have been selected.

8. The method of claim 1, wherein the selected estimated multiple transmission signals are selected based on an instantaneous error measure of the first signal.

9. The method of claim 1, wherein the selected estimated multiple transmission signals are re-encoded before symbols of the first signal are canceled.

10. The method of claim 1, wherein one or more symbols are selected and canceled from the first signal during an iteration, the symbols including the selected estimated multiple transmission signals.

11. The method of claim 3, wherein a level of error is determined without measuring interference or noise statistics.

12. A non-transitory computer program product storing instructions, which when executed by at least one data processor of at least one computing system, implement a method comprising:
receiving, by at least one data processor, data characterizing a first signal received on a plurality of antennas and comprising multiple transmission signals transmitted simultaneously on at least a same resource element in an orthogonal frequency-division multiple access (OFDM) communications system;
determining, using at least one data processor, a final estimate of the multiple transmission signals from at least the received data by iteratively estimating multiple transmission signals from the first signal and feeding back selected estimated multiple transmission signals, which satisfy a criterion, to cancel symbols of the first signal corresponding to the selected estimated multiple transmission signals; and
providing, using at least one data processor, data characterizing the final estimate of the multiple transmission signals, the final estimate comprising the selected estimated multiple transmission signals that are selected at a plurality of iterations.

13. The non-transitory computer program product of claim 12, wherein the final estimate of the multiple transmission signals comprises the estimated multiple transmission signals that are selected during each iteration.

14. The non-transitory computer program product of claim 12, wherein the selected estimated multiple transmission signals are selected based on having low error that is determined using the received first signal and a channel estimate.

15. The non-transitory computer program product of claim 12, wherein a predetermined number of estimated multiple transmission signals are selected during an iteration.

16. The non-transitory computer program product of claim 12, wherein the iterative estimation is performed until a stopping condition is reached, the stopping condition selected from a group consisting of: all symbols of the multiple transmission signals have been selected, a predetermined number of multiple transmission signals have been selected, and a level of instantaneous error in a most recently estimated symbol from the first signal exceeds a threshold.

17. The non-transitory computer program product of claim 12, wherein estimating multiple transmission signals from the first signal is performed according to:

$$\hat{X} = \text{slicer}\left((G^{Herm}G + \hat{\sigma}_v^2 I_K)^{-1} G^{Herm} y\right).$$

18. The non-transitory computer program product of claim 8, wherein canceling components of the first signal is according to:

$$y = y - G\hat{X}(i_{selected})$$

where y is the first signal, G is an estimate of channel characteristics, $\hat{X}$ is estimated multiple transmission signals, and $i_{selected}$ is the indices of symbols that have been selected.

19. A system comprising:
at least one data processor;
memory storing instructions which, when executed by the at least one data processor, causes the at least one data processor to perform operations comprising:
receiving data characterizing a first signal received on a plurality of antennas and comprising multiple transmission signals transmitted simultaneously on at least a same resource element in an orthogonal frequency-division multiple access (OFDM) communications system;
determining a final estimate of the multiple transmission signals from at least the received data by iteratively estimating multiple transmission signals from the first signal and feeding back selected estimated multiple transmission signals, which satisfy a criterion, to cancel symbols of the first signal corresponding to the selected estimated multiple transmission signals; and
providing data characterizing the final estimate of the multiple transmission signals, the final estimate comprising the selected estimated multiple transmission signals that are selected at a plurality of iterations.

20. The system of claim 19, wherein the final estimate of the multiple transmission signals comprises the estimated multiple transmission signals that are selected during each iteration.

21. The system of claim 19, wherein the selected estimated multiple transmission signals are selected based on having low error that is determined using the received first signal and a channel estimate.

22. The system of claim 19, wherein a predetermined number of estimated multiple transmission signals are selected during an iteration.

23. The system of claim 19, wherein the iterative estimation is performed until a stopping condition is reached, the stopping condition selected from a group consisting of: all symbols of the multiple transmission signals have been selected, a predetermined number of multiple transmission signals have been selected, and a level of instantaneous error in a most recently estimated symbol from the first signal exceeds a threshold.

24. The system of claim 19, wherein estimating multiple transmission signals from the first signal is performed according to:

$$\hat{X} = \text{slicer}\left((G^{Herm}G + \hat{\sigma}_v^2 I_K)^{-1} G^{Herm} y\right).$$

* * * * *